US00RE41451E

(19) United States
(12) Reissued Patent
Schmonsees

(10) Patent Number: US RE41,451 E
(45) Date of Reissued Patent: Jul. 20, 2010

(54) ELECTRONIC NOTE TAKING FROM NETWORK WEB PAGES

(76) Inventor: Robert J. Schmonsees, 258 Tyler View, Bumpass, VA (US) 23024

(21) Appl. No.: 11/324,117

(22) Filed: Jan. 3, 2006

Related U.S. Patent Documents

Reissue of:
(64) Patent No.: 6,675,213
Issued: Jan. 6, 2004
Appl. No.: 09/537,666
Filed: Mar. 29, 2000

(51) Int. Cl.
*G06F 15/173* (2006.01)

(52) U.S. Cl. ..... 709/225; 709/203; 709/226; 709/227; 715/512

(58) Field of Classification Search ..... 709/203, 709/225, 226, 227; 715/512
See application file for complete search history.

(56) References Cited

U.S. PATENT DOCUMENTS

| | | | | |
|---|---|---|---|---|
| 5,923,845 | A * | 7/1999 | Kamiya et al. | 709/206 |
| 6,230,171 | B1 | 5/2001 | Pacifici et al. | |
| 6,341,290 | B1 | 1/2002 | Lombardo et al. | |
| 6,366,923 | B1 * | 4/2002 | Lenk et al. | 707/104.1 |
| 6,591,295 | B1 * | 7/2003 | Diamond et al. | 709/217 |

* cited by examiner

*Primary Examiner*—Jinsong Hu
(74) *Attorney, Agent, or Firm*—Davidson Berquist Jackson & Gowdey, LLP

(57) ABSTRACT

An electronic note taking application is described in which a user may make check box selections on web pages such that certain portions of the web pages are cumulatively collected in a clipboard. As the user navigates through various web pages on a website, the user can make highlighted and checkmark selections in the web pages, which are cumulatively collected for later use and reporting. At the end of a session, the entire selection of selected materials from all web pages during the session can be displayed to the user as a single cohesive document.

17 Claims, 3 Drawing Sheets

ELECTRONIC NOTE TAKING FROM NETWORK WEB PAGES

Matter enclosed in heavy brackets [ ] appears in the original patent but forms no part of this reissue specification; matter printed in italics indicates the additions made by reissue.

FIELD OF THE INVENTION

The present invention relates to information capturing and storage and more particularly to data retrieval, capturing, formatting, storage, display, and reporting on selected data and information from multiple web pages by a user.

BACKGROUND AND SUMMARY OF THE INVENTION

The present invention addresses the problems associated with conveniently retrieving and storing information from web pages such as may be retrieved from the Internet. Currently, one can go on to the World Wide Web and retrieve information in the form of web pages (which is commonly formatted in the so-called HTML data format). It is common for a user who is investigating a particular subject on the World Wide Web to encounter a website having multiple web pages, describing, each depicting, and illustrating multiple and various aspects of the chosen subject matter. A common problem arises in that the user who is researching the subject matter finds the information available to them both overwhelming and not organized the way the user wants. That is, although the information on one particular web page may be organized in and of itself, portions of the information on that web page may be irrelevant to the user, portions may be cumulative to information previously seen by, or not relevant to, the user, and the information will rarely have an organizational structure associated with any other web page previously seen by the user.

A common method of navigating the World Wide Web when doing subject matter research is unfortunately to [printout] *print out* all web pages encountered so the user can, after the navigation session ends, sort and organize the various web pages printed out into some sort of coherent structure for use in the research. This process is time consuming and unnecessarily paper consuming.

The technology presently exists to call up a web page in a web browser, highlight a portion of text in the web page and copy that portion onto the clipboard feature of a locally running operating system or computer application. However, if one wishes to create accumulation of text portions from a variety of web pages at a variety of web links, the user must access the first web page, highlight a first portion of the first web page, copy the portion to the local clipboard, open a local application such as a word processing application, paste the clipboarded portion into a document of the word processing application, and then repeat the entire process for all of the remaining portions of all the remaining web pages of all of the remaining websites. In the end, the user will have the document in the word processing application (or other such similar application) that contains accumulation of the desired subject matter clips. There [is] *are*, however, a variety of different problems associated with that procedure. First, the procedure is extremely tedious and cumbersome in highlighting, clipboarding, and pasting so many different portions of so many different web pages since the user must constantly flip back and forth between the web page browser, and local word processing application to cut and paste the various portions of the web pages desired. In addition, the portions of the web pages may not necessarily be in formats conducive to pasting into the particular application (such as the word processing application or other such application) being employed. Third, the highlight, cut and paste procedure is not simple and user friendly.

The present invention provides a cumulative note taking feature, sometimes referred to herein by the nomenclature eNotes, which allows a user to identify portions of a web page that the user wishes to collect, and automatically collects and cumulates the portions into a clipboard upon a particular prompt. The accumulation of clipped portions can be printed out or emailed to the user when they indicate that they are finished with the web page.

In accordance with the present invention, the identification of the portions can be performed locally at a user workstation by a local application interacting with an [eNotes enabled] *eNotes-enabled* web page downloaded to the browser of the local workstation. The organization of the eNote portions are performed at a server such that the identification of selected portions by any particular user or by an accumulation of users can be monitored.

BRIEF DESCRIPTION OF THE DRAWINGS

These and other objects, features, and advantages of the present invention will now be described in conjunction with the drawings in which.

DETAILED DESCRIPTION OF THE PRESENTLY PREFERRED EMBODIMENT

Figure 1:
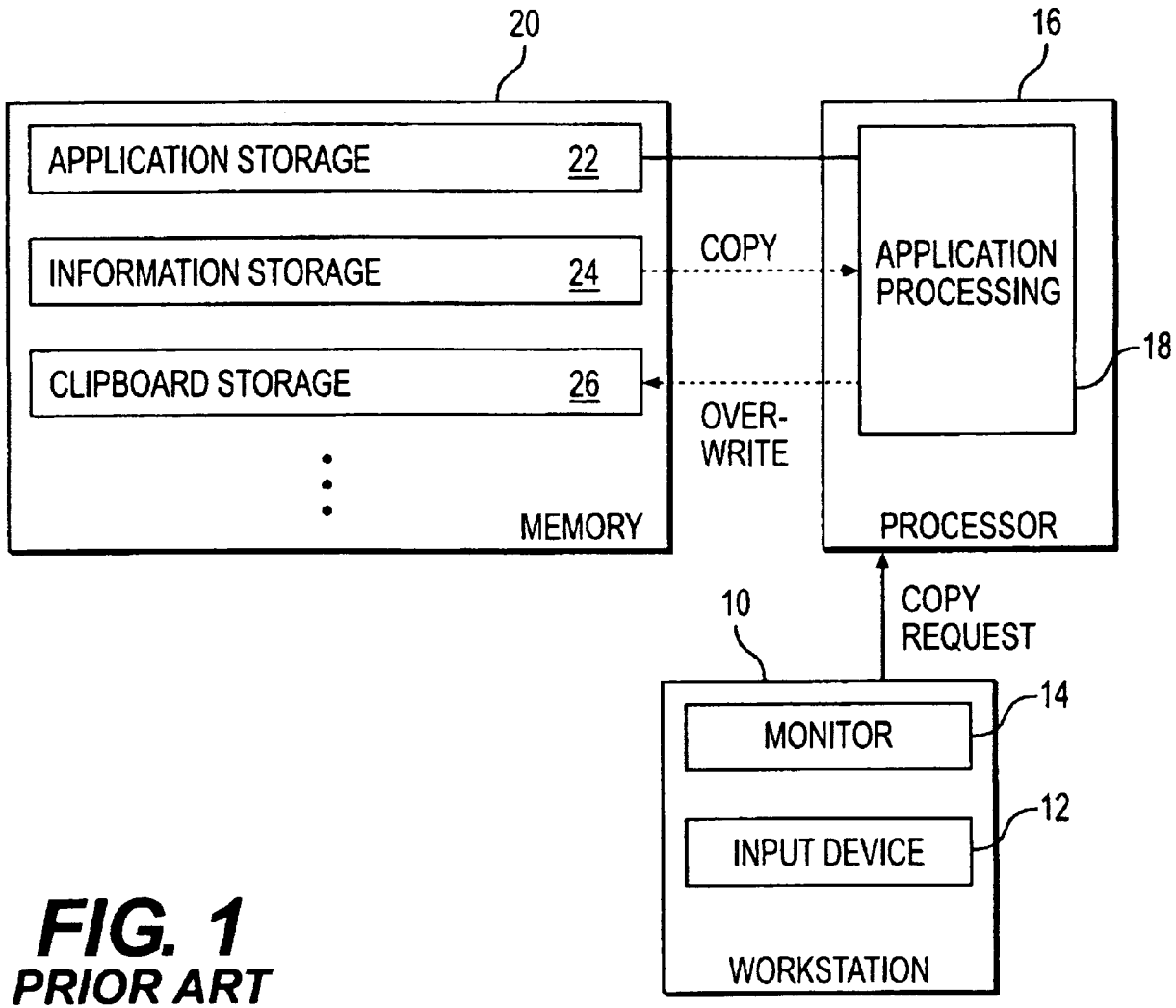
FIG. 1 PRIOR ART
FIG. 1 is a prior art schematic of a present clipboard feature.

FIG. 1 illustrates an example embodiment of a processing system that includes a clipboard feature. A workstation 10 includes an input device 12 and a monitor 14 present in the vicinity of a user. The input device 12 can be a keyboard, mouse, etc. The monitor 14 receives video signals either from the workstation itself or from processor 16. The workstation 10 communicates with the processor 16 and memory 20. Although workstation 10, processor 16, and memory 20 are shown as independent blocks, they may be (though need not be) combined into a single unit. Further, all communications that occur between workstation 10, processor 16, and memory 20 are not illustrated in FIG. 1, but only those signals which are particularly pertinent to understanding the present invention are provided. The artisan will understand that many other kinds of signals are passed bi-directionally between the workstation, processor and memory.

As shown in FIG. 1, the user desires to select a portion of information identified on the monitor 14, the user highlights the portion on the monitor 14 using the input device 12. The workstation 10 then sends a copy request to processor 16, which invokes the local application provided in application storage 22 to instruct the application processing element 18 as to the appropriate steps in the copy function.

The memory 20 includes different allocated storage area including a storage area for the application 22, information created or downloaded by the user in information storage 24 and information temporarily stored to clipboard storage 26. When the user of the workstation 10 sends the copy request from the workstation to the processor 18, the application processing 18 under the instruction of the application loaded in application storage 22 reads the select information from the information storage 24 and overwrites the information into the clipboard storage 26. The application processing 18 uses the clipboard storage 26 as a temporary storage of information for the user. Thus, for example, if the user is viewing a web page loaded in information storage 24, the user could select a portion of that web page, and request the application processing element 18 to temporarily load that information into the clipboard storage 26 of the memory 20. The user could then paste the clipboarded information into some other application as desired. When the user next [request] *requests* a copy of new web page information, the application processing element 18 will overwrite that new information into clipboard storage 26, thus losing the originally clipboarded information. In other words, in known clipboard functions, the user must copy the information from the clipboard into information storage 24 under some other application (such as a word processing application, etc.) or the user will lose the clipboarded information during the next overwrite.

Figure 2:
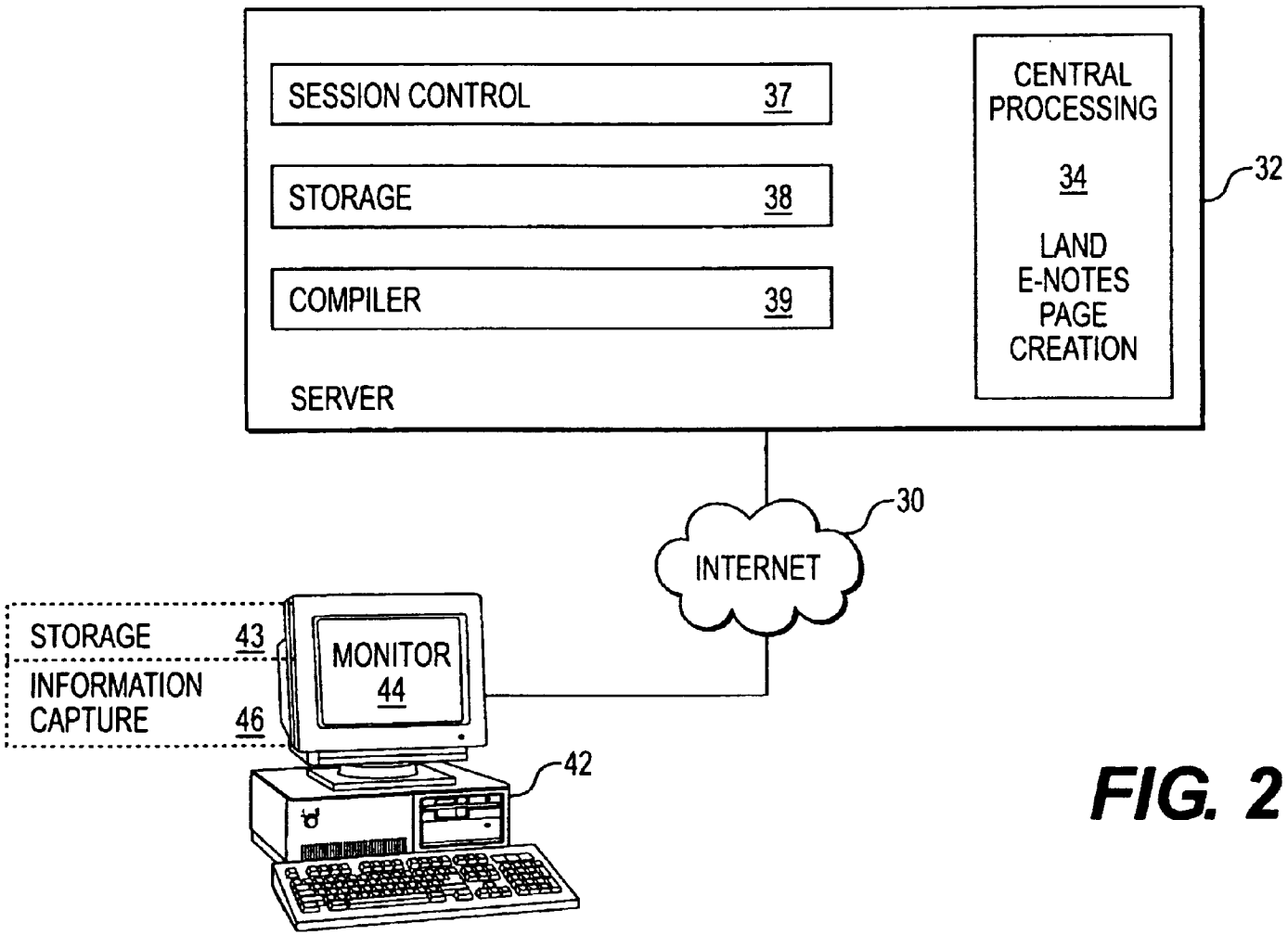
FIG. 2 is a schematic diagram of an example embodiment of the present invention.

On the other hand, the present invention provides a cumulative note taking function that operates under very user friendly processes. FIG. 2 illustrates an example architecture in which the present invention may, by example, be employed. In FIG. 2, a server 32 communicates with a workstation 42 over the Internet 30 in standard fashion such that the server 32 delivers [eNote enabled] *eNotes-enabled* web pages to the workstation storage 43 for viewing by the user at the workstation monitor 44. In the example embodiment of FIG. 2, the workstation 42 also includes an information capture function 46, which allows the user to identify the portions of the information they want to capture as personalized notes. In the example embodiment of FIG. 2, the server 32 includes a central processing and e-Notes page generation element 34 and various facilities associated therewith. In particular, communicating with central processing and eNotes generation element 34, are session control element 37, storage element 38, and compiler element 39. In accordance with this example, [eNotes enabled] *eNotes-enabled* web pages are created by the central processing and eNotes page creation function 34 on the server. These web pages are downloaded from the Internet 30 and loaded into a portion of workstation storage 43 like any other web page. Thereafter, the user views the information at the monitor 44 and may select, through the information capture facility 46, a portion of any web page, or several portions of any web page or multiple web pages as notes and information that the user wishes to collect for future use. Upon the prompt of the user, or alternatively upon the termination of the session, as monitored by the session controller 37, the information identified by the user to the information capture facility 46 is sent to the session control facility 37 which will instruct the compiler facility 39 to cumulatively compile and organize all of the information captured by the information capture facility 46 during the entire session. When completed, the compiler downloads an organized collection of all the information selected by the user from the [eNote enabled] *eNote-enabled* pages visited during the session such that the information is provided to the user of the workstation 40 in a cumulative and more organized fashion.

With the embodiment of FIG. 2, the web pages delivered by the server 32 to the workstation 42 can be monitored by the server 32 such that the selections made by the user at workstation 42 can be tracked. Thus, when a user makes a selection of a particular portion of a web page, the server 32 can retain in a separate portion of storage 38 under control of central processing unit 34 a listing of all topics identified for selection by a user and all topics identified for selection by all users. Such information can be used at a later time for statistical and informational purposes.

Figure 3:
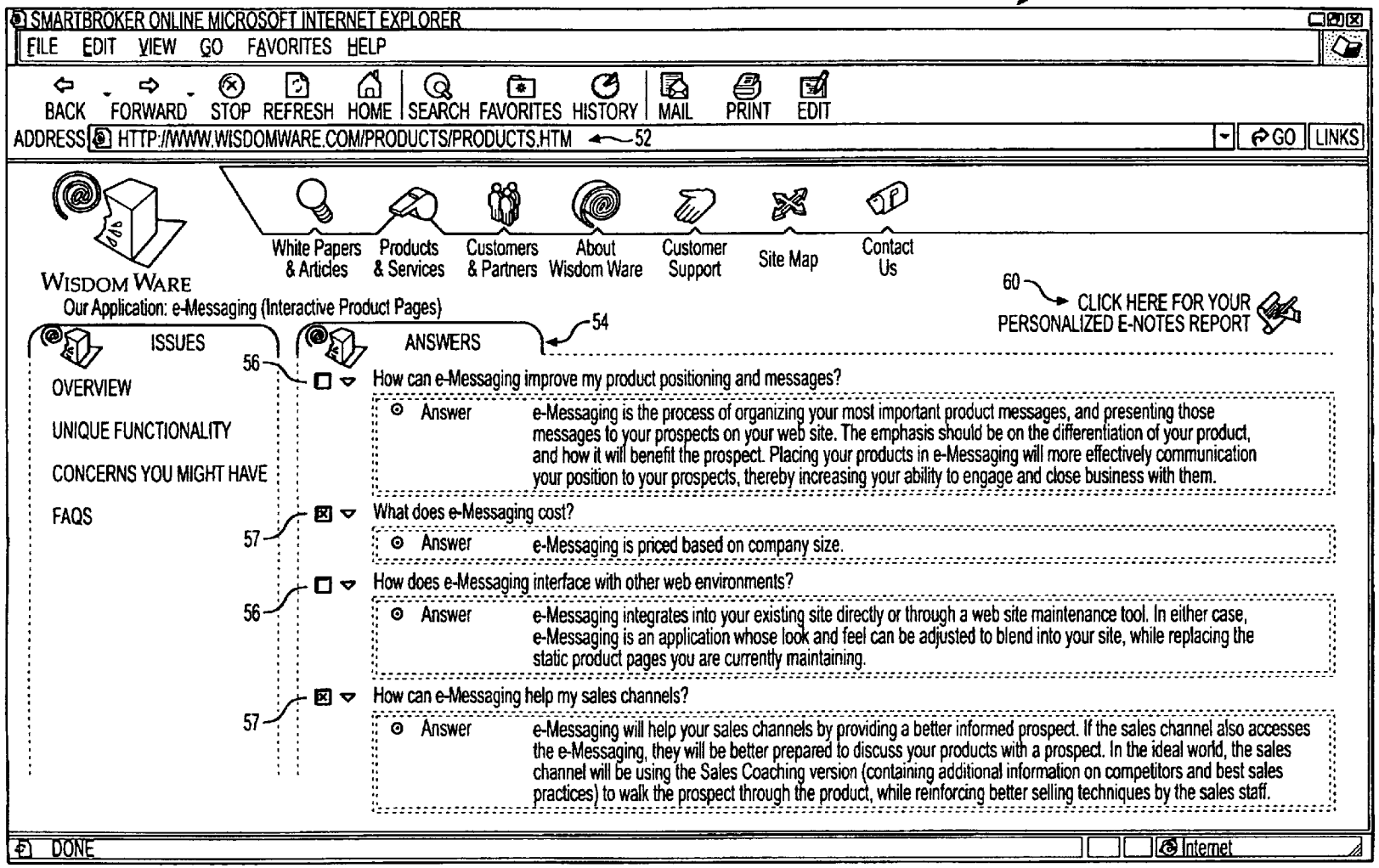
FIG. 3 is an example embodiment of a web page in accordance with one example of the present invention.

FIG. 3 illustrates an example embodiment of a web page that comports with an example of the present invention and may be used by the workstation 42 of FIG. 2. In FIG. 3, the graphical representation 50 includes an address line 52 where an [eNotes enabled] *eNotes-enabled* web page has been found by a browser of a workstation. In the example page shown in FIG. 3, an object oriented database has provided a listing of frequently asked questions 54. An example object oriented database is disclosed in U.S. Pat. No. 5,890,149 entitled Organization Training, Coaching and Indexing System; and in U.S. Pat. No. 5,842,221 entitled Dynamic Frequently Asked Questions (FAQ) System, both by Schmonsees and both incorporated herein by reference.

Of course, the format of the web page or the kinds of information displayed may be entirely different and still be within the course of the present invention. The example of FIG. 3 is for illustrative purposes in identifying how the selection and clipboarding aspects of the present invention preferably operate. Associated with each frequently asked question 54 shown in the graphical representation 50 is a check box 56 for taking eNotes. By pointing the user input device to the check box 56 and clicking the check box 56, the user is able to identify the particular selected frequently asked question 54 as a portion that the user wishes to take an eNote on. Boxes which have been checked 57 shows this user identification.

When the user is finished viewing the page, the user clicks the enable ENotes icon 60 in order to inform the server 32 (FIG. 2) that the user wishes to have the identified portions organized for later use. The portions identified by the user via the check boxes 56 are automatically moved into the compiler facility 39 as a cumulative listing of information which is then organized and sent back to the workstation storage 43 for display on the monitor 44 and future use of the user as they dictate. At the same time the specific eNotes are recorded in server storage 38 for future analysis.

FIG. 3 is an example only. Many other different types of data may be shown on the web page 50 that are not illustrated in FIG. 3 and yet are still contemplated within the present invention. For example, illustrations in various file formats, audio in various file formats, video in various file formats, pictures, text, and any other form of data can be included in the page 50 with associated check boxes 54 or any other means of identification of portions by the user.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

[1. A web server, comprising:

a web page facility to create web pages of predefined objects designed to be clipped and collected by a user and having check boxes associated with corresponding ones of a least some of the objects on said web pages;

a storage resource to temporarily store portions of selected web pages identified via the user selection indicators as a cumulative list of objects captured while the selected web pages are displayed; and a compiler to send the user the cumulative list of objects for display in an organized fashion and to collect information associated with historical selection activity of said predefined objects by multiple ones of said users.]

[2. A web server according to claim 1, further including:

a session controller that identifies a commencement and termination of a user session employing the server; and an information capture facility to electronically designate the user identified portions of the selected ones of the web pages.]

[3. A web server according to claim 2, wherein at least one of the information capture facility and the session controller also assigns a time stamp to the electronically designated user identified portions of the selected ones of the retrieved and displayed network web pages, and sends the time stamp to the storage resource for storage as an object associated with the corresponding captured object.]

[4. A web server according to claim 2, wherein at least one of the information capture facility and the session controller also assigns a network address stamp to the electronically designated user identified portions of the selected ones of the retrieved and displayed network web pages, and sends the network address stamp to the storage resource for storage as an object associated with the corresponding captured object.]

[5. A web server according to claim 2, further including a relational database of objects, links and pointers associated with the web pages, and wherein the information capture facility cooperates with the relational database to provide selection boxes adjacent at least some of said objects, links and pointers contained and displayed in the requested local network web pages; and said storage resource cooperates with the relational database to correlate user denoted selections in said check boxes with said storage of the corresponding objects displayed in the web pages.]

[6. A web server according to claim 2, wherein at least one of the storage resource and the information capture facility maintain a cumulative listing over a plurality of sessions of said identified portions of the selected web pages.]

[7. A web server according to claim 2, further including an enable operator to provide a user selectable identifier to enable the information capture facility.]

[8. A web server according to claim 1, wherein:

the storage resource is a database storing each identified portion of each selected web page as a database object.]

[9. A web server according to claim 8, wherein the database further includes a pointer list to identify the database objects as the cumulative list of captured objects.]

[10. A web server according to claim 1, wherein:

the check boxes are displayed adjacent the corresponding objects displayed in the web pages; and said storage resource further includes a relational database to correlate user denoted selections in said check boxes with said storage of the corresponding objects displayed in the web pages.]

[11. A web server according to claim 10, further including an enable operator to provide a user selectable identifier to enable the check boxes.]

[12. A method of clipboarding information from network web pages, comprising:

displaying selected web pages;

providing check boxes graphically associated with data objects displayed on said web pages;

identifying a user entry associated with at least one of said check boxes of at least one of said web pages;

collecting information associated with the identified user entries for each of said selected web pages into a common electronic clipboard; and displaying in an organized fashion all of the collected information associated with the identified user entries from the common electronic clipboard.]

[13. A method according to claim 12, further including:

user enabling the displaying step via a graphical user interface button.]

[14. A method of clipboarding information from network web pages comprising:

providing a web browser routine operatively associated with a browser displaying a selected one of said network web pages;

graphically pre-identifying multiple discrete pre-defined portions of said at least one web page displayed with corresponding check boxes, said portions being graphically pre-identified prior to being displayed by said browser;

recording user selections of said portions;

collecting the selections into a common electronic clipboard; and displaying in an organized fashion all of the collected portions from the common electronic clipboard for a user for a session.]

[15. A method as in claim 14 wherein the displaying step is initiated by a user instruction to display the collected portions.]

[16. A method as in claim 14 wherein the collecting and displaying steps are initiated by a user instruction to collect and display the collected portions.]

[17. A method as in claim 14 wherein the user-selected multiple discrete portions are portions of multiple sequentially user-selected and displayed network web pages.]

[18. A method as in claim 14, further including the step, upon user prompt, of purging the collected portions from the clipboard.]

[19. A method of clipboarding information according to claim 16 wherein the routine is a plug-in.]

[20. A method of clipboarding information according to claim 14 further including the step of maintaining an unlimited number of the collected portions over a plurality of browser sessions.]

[21. A method of clipboarding information according to claim 14 further including the step of recording timestamp and URL information associated with the discrete portions selected by the user.]

[22. A method of clipboarding information according to claim 21 further including the step of sending the timestamp and URL to a network server.]

[23. A method according to claim 14 further including the step of sending at least an indication of the identified user selected portions to a server.]

[24. A method of clipboarding information according to claim 14 wherein:

the routine is a plug-in;

the method further maintains an unlimited number of the collected portions over a plurality of sessions of the browser;

the method further stores timestamp and URL information associated with the user selected portions; and the method further includes the step of at least one of:

sending the timestamp and URL information to a server, or sending at least an indication of the identified user selected portions to a server.]

*25. A method of clipboarding information from network web pages, the method being operable in a system in which a*

*computer is operatively connected to a network of computers, said computer including a monitor, an input device, and a web browser, said network including at least one server, the method comprising:*

*providing said computer with said network web pages, each of said network web pages having been specifically created to include at least one predefined data object for clipping and collection by a user, said providing of said network web pages including providing user-selectable regions/areas associated with and distinct from at least some of said predefined data objects displayed on a displayed network web page;*

*detecting, at said computer, user selections of more than one of said user-selectable regions/areas;*

*cumulatively collecting information associated with a plurality of said predefined data objects corresponding to the detected user selections; and*

*maintaining the collected information in a storage resource for future use.*

*26. A method as in claim 25 further comprising: displaying at least some of the collected information.*

*27. A method as in claim 25 wherein the information is collected in a common electronic clipboard.*

*28. A method as in claim 25 wherein at least one said user-selectable region/area comprises a check box.*

*29. A method as in claim 25 wherein at least one said user-selectable region/area is graphically displayed as a square shape.*

*30. The method of claim 25 wherein at least two of said user selection actions take place in distinct sessions.*

*31. The method of claim 25 wherein said collected information is maintained for a future use selected from the group comprising:*

*recording for future analysis; printing; and emailing.*

*32. A method of clipboarding information from a web page, the method being operable in a system in which a computer is operatively connected to a network of computers, said computer including a monitor, an input device, and a web browser, said network including at least one server, the method comprising:*

*providing a web browser routine operatively associated with a browser displaying said web page;*

*providing said web page, said web page having been created to include multiple discrete pre-defined portions having corresponding user-selectable regions/areas;*

*graphically pre-identifying said multiple discrete pre-defined portions of said web page displayed with said corresponding user-selectable regions/areas, said pre-defined portions being graphically pre-identified prior to being displayed by said browser; each said user-selectable region/area being distinct from each other user-selectable region/area and being distinct from said corresponding pre-defined portions,*

*recording information associated with a plurality of user selections of a plurality of said pre-defined portions;*

*cumulatively collecting the information associated with the plurality of user selections of said plurality of pre-defined portions; and*

*maintaining information associated with a plurality of said selections for subsequent use.*

*33. A method as in claim 32 wherein said subsequent use is selected from the group comprising:*

*printing said user selections; displaying said user selections; and e-mailing said user selections.*

*34. A method as in claim 32 wherein said collecting of said user selections occurs in response to a user request.*

*35. A method as in claim 34 wherein said collecting of said user selections occurs automatically.*

*36. The method of claim 32 wherein at least two of said user selection actions take place in distinct sessions.*

*37. The method of claim 32 wherein at least one of said user-selectable region/area comprises a check box.*

*38. The method of claim 32 wherein at least one of said user-selectable region/area is graphically displayed as a rectangular shape.*

*39. The method of claim 32 wherein said collected information is maintained for a future use selected from the group comprising:*

*recording for future analysis; printing; and emailing.*

*40. A method of clipboarding information from network web pages, the method being operable in a system in which a computer is operatively connected to a network of computers, said computer including a monitor, an input device, and a web browser, said network including at least one server, said information comprising individual search results, the method comprising:*

*providing said network web pages, each of said network web pages having been specifically created to include at least one predefined data object for clipping and collection by a user;*

*displaying a plurality of selected network web pages;*

*providing a predefined clipping function associated with the search results displayed on said network web pages;*

*identifying user selection actions initiating said predefined clipping function associated with more than one of said search results of at least one of said network web pages;*

*cumulatively collecting information associated with the identified user search results for each of said selected web pages into a common electronic clipboard; and*

*displaying all of the collected information associated with the identified user selection actions from the common electronic clipboard.*

*41. The method of claim 40 wherein at least two of said user selection actions take place in distinct sessions.*

* * * * *